W. R. MEREDITH.
TIRE FOR VEHICLES.
APPLICATION FILED MAR. 28, 1913.

1,143,982.

Patented June 22, 1915.

WITNESSES
R. S. Harrington
G. A. Messer

William R. Meredith
INVENTOR
By E. J. Durell Jr.
Attorney

UNITED STATES PATENT OFFICE.

WILLIAM R. MEREDITH, OF YOUNGSTOWN, OHIO.

TIRE FOR VEHICLES.

1,143,982. Specification of Letters Patent. Patented June 22, 1915.

Application filed March 28, 1913. Serial No. 757,893.

*To all whom it may concern:*

Be it known that I, WILLIAM R. MEREDITH, a subject of the King of Great Britain and Ireland, residing at Youngstown, in the county of Mahoning and State of Ohio, have invented new and useful Improvements in Tires for Vehicles, of which the following is a specification.

My invention relates to improvements in tires for vehicles such as automobiles, motor-trucks, and the like.

The principal object of the invention is to provide a solid tire with means for producing a resiliency, so that it may be used with like effect wherever a pneumatic tire can be used. An obvious advantage of this is that solid tires so constructed may be employed in place of pneumatic tires on automobiles, and when used on motor-trucks which require solid tires, they give better results.

With these and other objects and advantages in view, the invention consists in the construction and combination of parts hereinafter described and claimed.

The description is illustrated by the accompanying drawing, forming a part of this application.

Figure 1:
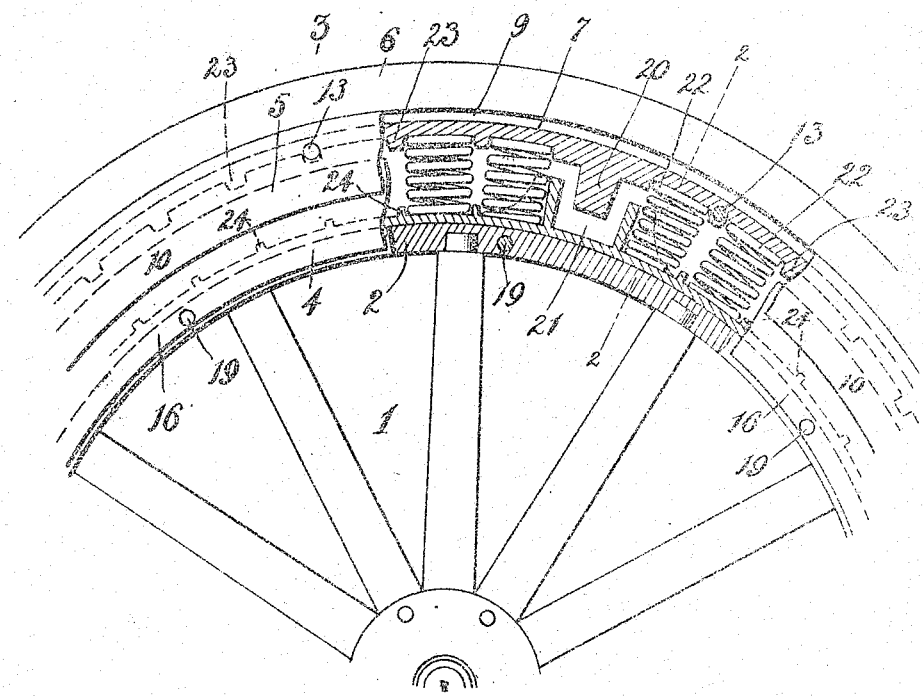
Figure 2:
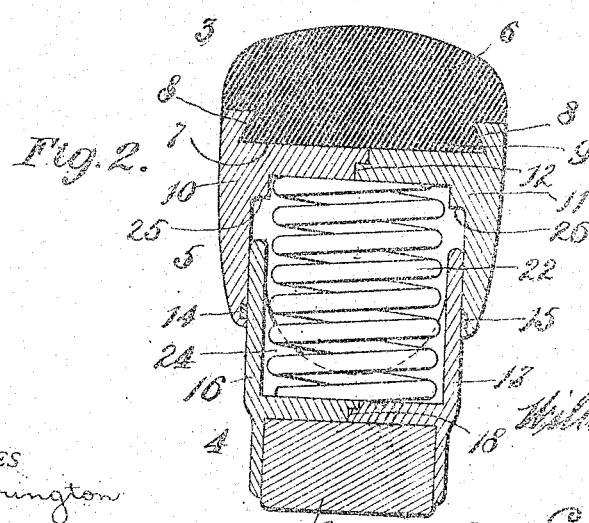

In the drawing, Figure 1 represents a partial side elevation of a vehicle wheel embodying my invention, parts being broken away to more clearly show the construction; and Fig. 2 is a transverse sectional view on line 2—2 of Fig. 1.

Referring to the illustrated construction, the different parts of which are designated by numerals, 1 is the wheel, 2 the rim thereof and 3 the tire. The latter comprises the casings 4 and 5, and the rubber tread 6. The tread is preferably of the solid type. To securely fasten the tread to the casing 5, the latter is formed with the annular recess or depression 7, having undercut side-walls 8, 8, and the inner part or surface of the tread is made to correspond therewith so that said part 9 can be sprung in position.

The casings may be made of metal or vulcanized fiber. Casing 5 comprises annuli 10 and 11 which meet in a shouldered joint 12, beneath the tread 6, and are secured together by rivets or bolts 13. This casing 5 fits over the casing 4, and annular felt wipers 14 and 15, arranged in recesses in the inner faces of the former casing, are interposed between the two said casings. The other casing 4 also consists of two annuli, 16 and 17, which meet in a shouldered joint 18, above the surface of the rim 2, and are secured together by the rivets or bolts 19, which pass through said rim. A depending lug 20, on the inside of casing 5, registers with a recess 21, formed inside of casing 4 and maintains the correct relative position of the two casings.

A series of helical springs 22, are located between the two said casings and confined by the annuli comprising them. These springs are spaced apart by ribs 23 formed inside of casing 5, and oppositely-located ribs 24 formed inside of the casing 4, the two sets of ribs being transverse of the casing. These ribs form what may be termed chambers for the reception and confinement of the helical springs. These springs are made to act by compression to create a resiliency in the casings and produce the effect of air in the pneumatic tires.

The construction above described permits all of the parts to be easily assembled or replaced. Annular shoulders 25 and 26, formed on the inside of the movable casing, are suitably spaced apart from the peripheries of the annuli comprising the fixed casing 4, to permit the radial movement of the first-named casing but to limit such movement beyond what is sufficient to accomplish resiliency in the tire as assembled.

Having thus fully described my invention, what I claim as new and desire to secure by Letters Patent of the United States, is:

A vehicle tire, including an inner fixed casing, an outer, inwardly yielding casing, each of said casings comprising annuli, said outer casing having an annular peripheral recess, a tread member having an inner annular rib received by said annular peripheral recess of the outer casing, said inner casing having an inner annular recess, a rim received by the inner recess of said inner casing, and spaced springs intermediate said inner and outer casings, said outer casing embracing said inner casing, and said outer casing having upon its inner surface, opposed stepped outlines, the resultant recess and shoulders receiving the outer ends of said springs and forming controlling stops for said inner casing, respectively, the outer casing having inwardly extending projections at right angles to said inner stepped outline thereof, between the springs at the outer ends thereof, and said outer casing having upon its inner surface lugs between pairs of said springs, and said inner casing having "well"-forming members receiving therebetween the outer ends of said lugs, said inner casing also having inwardly extending projections opposed to the inwardly extending projections of the outer casing for the inner ends of said springs.

In testimony whereof I hereunto affix my signature in presence of two witnesses.

WILLIAM R. MEREDITH.

Witnesses:
 DALE R. HAHN,
 EDWARD R. JOSHUA.